United States Patent [19]

Saka et al.

[11] Patent Number: 5,383,800
[45] Date of Patent: Jan. 24, 1995

[54] RELAY TERMINAL FOR USE IN BRANCH CONNECTING BOX

[75] Inventors: Yuuji Saka; Takahiro Onizuka, both of Yokkaichi, Japan

[73] Assignee: Sumitomo Wiring Systems, Ltd., Yokkaichi, Japan

[21] Appl. No.: 250,654

[22] Filed: May 27, 1994

Related U.S. Application Data

[63] Continuation of Ser. No. 21,572, Feb. 24, 1993, abandoned.

[30] Foreign Application Priority Data

Mar. 30, 1992 [JP] Japan ............................. 4-017674[U]

[51] Int. Cl.⁶ ............................................. H01R 11/09
[52] U.S. Cl. ...................... 439/787; 439/852; 439/76
[58] Field of Search .............. 439/787, 843, 845, 849, 439/850, 852, 76, 723, 724

[56] References Cited

U.S. PATENT DOCUMENTS

| | | | |
|---|---|---|---|
| 3,381,261 | 4/1968 | Deakin | 439/787 |
| 3,836,947 | 9/1974 | Yeager | 439/852 |
| 3,853,389 | 12/1974 | Occhipinti . | |
| 4,798,545 | 1/1989 | Roy et al. . | |
| 4,874,338 | 10/1989 | Bakermans . | |
| 4,919,628 | 4/1990 | Mobley et al. | 439/852 X |
| 4,950,183 | 8/1990 | Watanabe et al. | 439/843 |
| 4,975,082 | 12/1990 | Nagasaka et al. . | |
| 5,106,324 | 4/1992 | Natsume . | |
| 5,122,083 | 6/1992 | Watanabe et al. . | |

FOREIGN PATENT DOCUMENTS

| | | |
|---|---|---|
| 336612 | 10/1930 | United Kingdom . |
| 921565 | 3/1963 | United Kingdom . |
| 1397376 | 6/1975 | United Kingdom . |
| 1548698 | 9/1979 | United Kingdom . |
| 2155254 | 9/1985 | United Kingdom . |

OTHER PUBLICATIONS

IBM Technical Bulletin, vol. 13 No. 11, Apr. 1971.

*Primary Examiner*—Khiem Nguyen
*Attorney, Agent, or Firm*—Sandler, Greenblum & Bernstein

[57] ABSTRACT

A pair of connecting springs is formed in the vicinity of the upper and lower ends of surfaces of a relay terminal and are opposed to each other in such a manner that the connecting springs project inward in the configuration of a circular arc. A gap, through which tabs are inserted, is provided between each pair of the connecting springs.

4 Claims, 4 Drawing Sheets

RELAY TERMINAL FOR USE IN BRANCH CONNECTING BOX

This application is a continuation of application Ser. No. 08/021,572, filed Feb. 24, 1993, now abandoned.

BACKGROUND OF THE INVENTION

1. Field of the Invention

The present invention relates to a relay terminal for electrically connecting a tab of a bus bar of a branch connecting box installed on an automobile and a tab of a functional component such as a fuse, a relay or the like with each other.

2. Description of the Related Arts

As a conventional relay terminal of this kind, there are two types, namely, tongue type and curl type. Referring to FIG. 4, in the tongue type relay terminal, a tab 2 is inserted into a curved spring tongue portion 1a of a relay terminal 1 so as to connect the curved tongue portion 1a and the tab 2 with each other. Referring to FIG. 6, in the relay terminal of curl type, a tab 2 is inserted into curled spring portion 3a and 3a of a relay terminal 3 so as to connect the curled spring portion 3a and 3a and the tab 2 with each other.

In the tongue type relay terminal 1, the curved spring tongue portion 1a is brought into contact with the tab 2 in an unstable state because the curved spring tongue portion 1a is of cantilever type. An expensive material is required so that the curved spring tongue portion 1a is in contact with the tab 2 in a stable state. Further, in bending a plate material to manufacture the relay terminal 1, the curved spring tongue portion 1a projects a great deal from a main body 1b. Therefore, a great amount of material is required to manufacture the relay terminal 1 and thus the yield per material is unfavorable. Accordingly, the cost for manufacturing the relay terminal 1 is high. In addition, since the curved spring tongue portion 1a is curved, a die in a complicated construction is required and hence the cost of the die is high. That is, the manufacturing cost is high.

In the curl type relay terminal 3, it is necessary to insert the tab 2 into the curled spring portion 3a and take out the tab 2 therefrom by a great force and also necessary to form a gap for receiving the tab 2 with a high accuracy. Thus, the cost for manufacturing the relay terminal 3 is high.

SUMMARY OF THE INVENTION

It is an object of the present invention to provide a relay terminal, for use in a branch connecting box, which is stably brought into contact with a tab of a bus bar of the branch connecting box and a tab of a functional component and which can be manufactured at a low cost.

In accomplishing these and other objects of the present invention, there is provided a relay terminal, rectangular and hollow cylindrical, for use in a branch connecting box into which the relay terminal is inserted so that one end of the relay terminal is connected with a tab of a bus bar and the other end thereof is connected with a tab of a functional component such as a fuse or a relay. In the above construction, a pair of connecting springs is formed in the vicinity of the upper and lower ends of surfaces of the relay terminal opposed to each other in such a manner that the connecting springs project inward in the configuration of a circular arc with a gap, through which each tab is inserted, provided between each pair of the connecting springs.

The relay terminal is formed by bending a plate-shaped material in a rectangular and hollow cylindrical configuration.

According to the above construction, a pair of the connecting springs is formed in the vicinity of the upper and lower ends of the surfaces of the rectangular cylindrical relay terminal opposed to each other in such a manner that the connecting springs project inward in the configuration of a circular arc with a gap provided between each pair of the connecting springs. Accordingly, the connecting springs contact the tabs in a stable state. In addition, the main body section of a plate-shaped material is embossed to form the connecting springs. Therefore, a smaller amount of material suffices to manufacture the relay terminal than the conventional tongue type relay terminal, i.e., the yield per material is more favorable than that of the conventional tongue type relay terminal and hence the cost for manufacturing the relay terminal is lower than the cost for manufacturing the conventional relay terminal. Further, since the connecting springs can be formed by only embossing the main body section of the material, the cost of a die is lower than the cost of a die used to mold the conventional tongue type relay terminal. Moreover, the gap between the connecting springs can be easily adjusted. Accordingly, the connecting springs can be brought into contact with the tabs in a more favorable state, respectively than the conventional tongue type relay terminal.

In addition, the relay terminal has a pair of connecting springs, at the upper and lower ends thereof, opposed to each other. Therefore, even though there is a size error between the relay terminal and the accommodating space in the manufacture of the branch connecting box or in the insertion of the relay terminal into the branch connecting box, the connecting springs act in such a manner that a contact load is equally applied to both connecting springs opposed to each other when the tabs are inserted into the accommodating space. As a result, the tabs can be inserted into the accommodating space and taken out therefrom by a small force. In this manner, such an error can be automatically corrected. The connecting springs are formed to be symmetrical vertically and horizontally. Accordingly, there is no directivity in installing the relay terminal into the accommodating space. Therefore, the relay terminal can be easily mounted in the accommodating space.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1A:
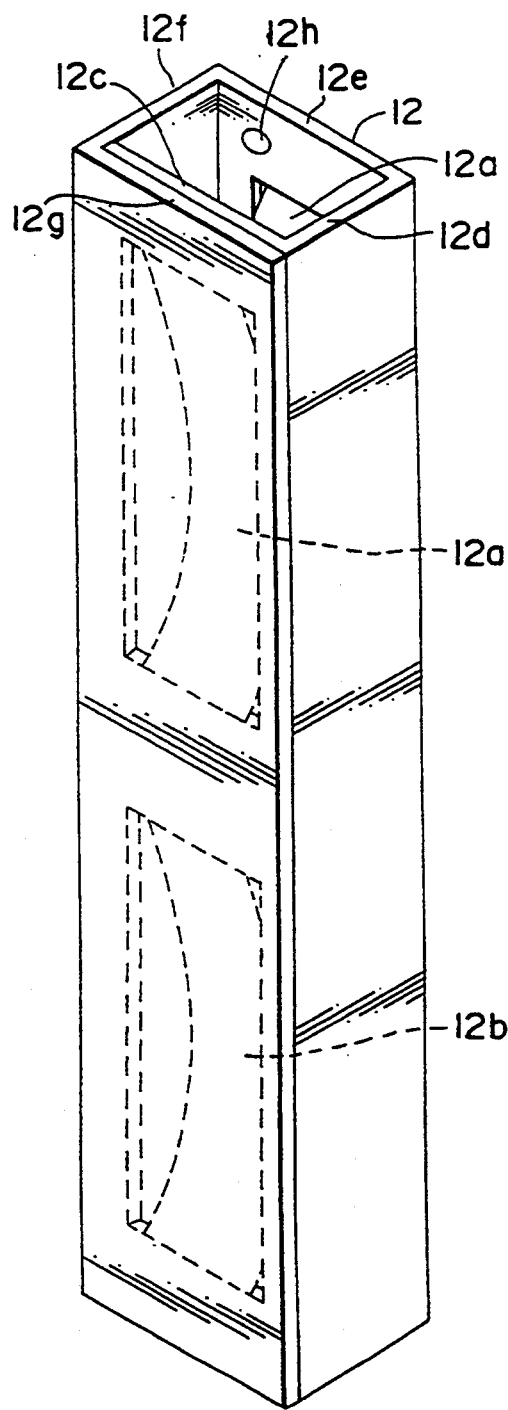
FIG 1A is a perspective view showing a relay terminal according to an embodiment of the present invention.

Before the description of the present invention proceeds, it is to be noted that like parts are designated by like reference numerals throughout the accompanying drawings.

A branch connecting box according an embodiment of the present invention is described below with reference to FIGS. 1, 2, and 3.

Figure 2:
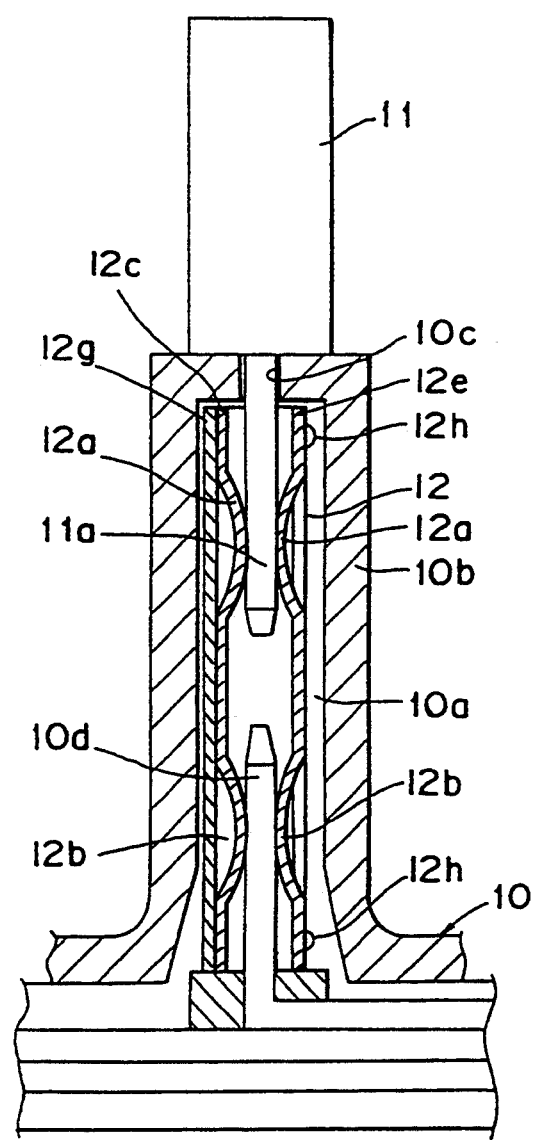
FIG. 2 is a sectional view showing the relay terminal of FIG. 1A accommodated in an accommodating space of a branch connecting box.

Referring to FIG. 2, a branch connecting box 10 comprises a block section 10b having an accommodating space 10a for accommodating a sectionally rectangular relay terminal; and a slit 10c, formed in the upper surface of the block section 10b, through which a tab 11a of a functional component 11 such as a fuse or a relay is inserted downward into the accommodating space 10a. The slit 10c is disposed in the middle of the branch connecting box 10 in the width direction thereof. The branch connecting box 10 comprises a bus bar (not shown) and a tab 10d of the bus bar inserted upward into the accommodating space 10a.

Figure 1B:
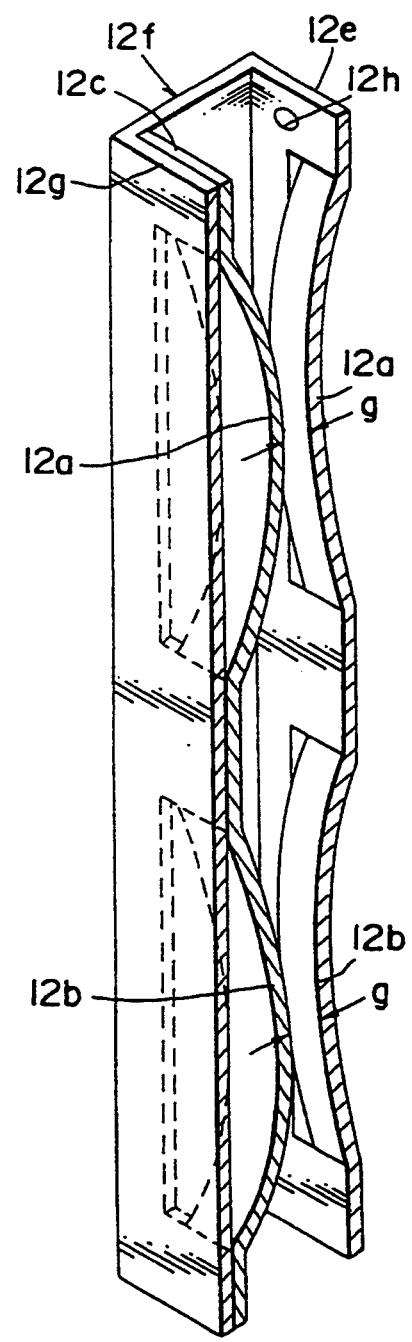
FIG. 1B is a perspective view showing the relay terminal of FIG. 1A in which principal portions are sectionally shown.

Referring to FIG. 1, a relay terminal 12 to be accommodated in the accommodating space 10a of the block section 10b is rectangular and hollow cylindrical. A pair of connecting springs 12a, 12a and a pair of connecting springs 12b, 12b are formed in the vicinity of the upper and lower ends of surfaces 12c and 12e, respectively opposed to each other in the width direction of the branch connecting box 10 in such a manner that the connecting springs 12a, 12a and 12b, 12b project inward in the configuration of a circular arc with a gap (g) provided between the connecting springs 12a and 12a and between the connecting springs 12b and 12b. The tab 11a of the functional component 11 and the tab 10d of the bus bar are inserted into the space accommodating space 10a through the gap (g).

Figure 3:
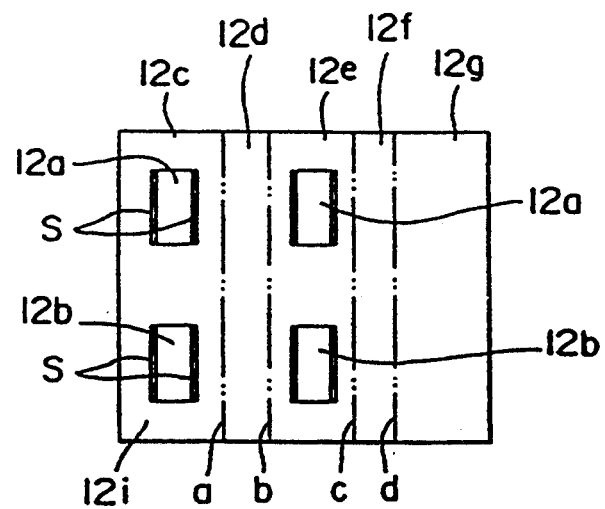
FIG. 3 is a development view showing the relay terminal.
Figure 4:
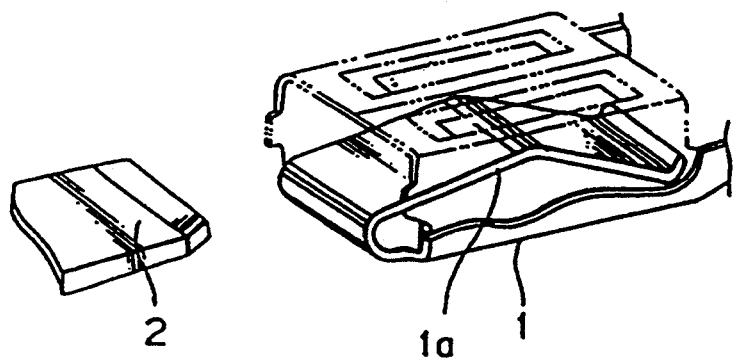
FIG. 4 is a perspective view showing a conventional tongue type relay terminal.
Figure 5:
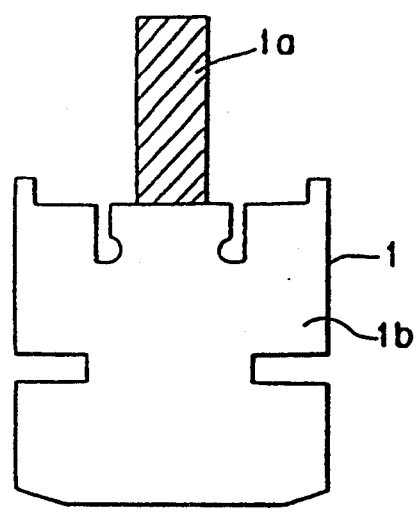
FIG. 5 is a development view showing the conventional tongue type relay terminal shown in FIG. 4.
Figure 6:
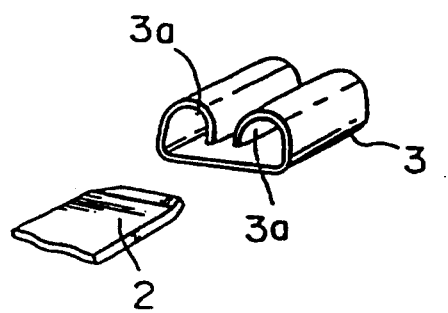
FIG. 6 is a perspective view showing a conventional curl type relay terminal.

Referring to FIG. 3, the positions of the following three surfaces are set on a main body section 12i of a rectangular metal plate, for example, a copper alloy plate: The surfaces 12c and 12e opposed to each other in the width direction of the branch connecting box 10, surfaces 12d and 12f opposed to each other in the lengthwise direction of the branch connecting box 10, and a surface 12g which is to be installed on the outer surface of the surface 12c. Then, slits (s) are formed in upper and lower portions of each of the surfaces 12c and 12e to emboss the surfaces 12c and 12e by a press into a circular arc configuration. In this manner, the connecting springs 12a, 12a and 12b, 12b are formed, with the connecting springs 12a, 12a and 12b, 12b opposed to each other, respectively.

The main body section 12i of the metal plate is folded in the following order: The surface 12d is folded along a line (a) toward the surface 12c by the press; the surface 12e is folded toward the surface 12d along a line (b), and the surface 12f is folded toward the surface 12e along a line (c), and finally, the surfaces 12g is folded toward the surface 12f along a line (d). Then, the surface 12g is layered on the outer surface of the surface 12c. As a result, the relay terminal 12 is formed as shown in FIG. 1.

The relay terminal 12 is accommodated in the accommodating space 10a in the width direction of the branch connecting box 10 with a slight gap provided between the relay terminal 12 and the accommodating space 10a. Referring to FIG. 1, in the relay terminal 12, the thickness of the surface on the left side consisting of the surfaces 12c and 12g is greater than that of the surface 12e opposed to the surface 12c. Projections 12h and 12h, the height of which correspond to the thickness of the surface 12g are formed on the surface 12e. In this manner, the relay terminal 12 can be accommodated in the middle of the accommodating space 10a in the width direction thereof.

In this construction, the tab 10d of the bus bar is inserted between the connecting springs 12b and 12b disposed in the vicinity of the lower end of the relay terminal 12 so as to connect the tab 10d of the bus bar with the relay terminal 12 accommodated in the accommodating space 10a of the block section 10b. Then, the tab 11a of the functional component 11 is inserted from the slit 10c of the block section 10b through the gap (g) between the connecting springs 12a and 12a disposed in the vicinity of the upper end of the relay terminal 12 so as to connect the tab 11a of the functional component 11 with the relay terminal 12.

The connecting springs 12a, 12a and 12b, 12b of the relay terminal 12 are opposed to each other in the vicinity of the upper and lower ends of the relay terminal 12, respectively. Accordingly, the connecting springs 12a, 12a and 12b, 12b contact the tabs 11a and 10d, respectively in a stabler state than the conventional tongue type relay terminal. In addition, as shown in FIG. 3, the main body section 12i is embossed to form the connecting springs 12a 12a and 12b, 12b. Therefore, a smaller amount of material suffices to manufacture the relay terminal than the conventional tongue type relay terminal, i.e., the yield per material is more favorable than that of the conventional tongue type relay terminal and hence the cost for manufacturing the relay terminal is lower than the cost for manufacturing the conventional relay terminal. Further, since the connecting springs 12a, 12a and 12b, 12b can be formed by only embossing the main body section 12i, the cost of a die is lower than the cost of the die used to mold the conventional tongue type relay terminal. Moreover, the size of the gad (g) between the connecting springs 12a and 12a and between the connecting springs 12b and 12b can be easily adjusted. Accordingly, the connecting springs 12a, 12a and 12b, 12b can be brought into contact with the tabs 11a and 10d in a more favorable state, respectively than the conventional tongue type relay terminal.

The relay terminal 12 has connecting springs 12a, 12a and 12b, 12b opposed to each other, respectively. Therefore, even though there is a size error between the relay terminal 12 and the accommodating space 10a in the manufacture of the branch connecting box 10 or in the insertion of the relay terminal 12 into the branch connecting box 10, the connecting springs 12a, 12a and 12b, 12b act in such a manner that a contact load is equally applied to each of the connecting springs 12a and 12a and each of the connecting springs 12b and 12b when the tabs 11a and 10d are inserted into the accommodating space 10a. Consequently, the tabs 11a and 10d can be inserted into the accommodating space 10a and taken out therefrom by a small force. In this manner, such an error can be automatically corrected.

Since the connecting springs 12a, 12a and 12b, 12b are formed to be symmetrical vertically and horizontally, and the projections 12h and 12h are formed on the surface 12e, there is no directivity in installing the relay terminal 12 into the accommodating space 10a. Therefore, the relay terminal 12 can be easily mounted in the accommodating space 10a. As described previously, in folding the plate-shaped material to manufacture the relay terminal 12 in the embodiment described above, it is possible to form the connecting springs 12a and 12b by embossing a plate into rectangular cylindrical configurations instead of a circular arc configuration.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A relay terminal for use in a branch connecting box into which the relay terminal is inserted to connect a first end of the relay terminal with a tab of a bus bar and a second end of the relay terminal with a tab of a functional component, said relay terminal comprising a first pair of connecting springs on surfaces of the relay terminal in the vicinity of the first end of the relay terminal, and a second pair of connecting springs on surfaces of the second end of the relay terminal, the connecting springs of each pair being opposed to each other in such a manner that the connecting springs project inward in the configuration of a circular arc with a gap provided between each pair of the connecting springs, through which each tab is inserted between said pair of the connecting springs, opposed ends of each of said connecting springs being connected to surfaces of the relay terminal, whereby a contact load is equally applied to each connecting spring when the respective tabs are inserted into the relay terminal, and wherein the relay terminal is a bent plate-shaped material of a hollow cylindrical configuration, end edges of said plate-shaped material overlapping at a first surface portion, a second surface portion being opposed to said first surface portion, projections being located on said second surface portion, said projections having a height substantially equal to the thickness of said plate-shaped material, whereby said relay terminal can be inserted in the center of said connecting box.

2. The relay terminal as defined in claim 1, wherein the relay terminal is of rectangular configuration.

3. The relay terminal as defined in claim 1, wherein said connecting springs comprise an embossed plate-shaped material.

4. The relay terminal as defined in claim 1, wherein the first and second pair of connecting springs are symmetrical vertically and horizontally with respect to each other.

* * * * *

UNITED STATES PATENT AND TRADEMARK OFFICE
CERTIFICATE OF CORRECTION

PATENT NO. : 5,383,800
DATED : January 24, 1995
INVENTOR(S) : Yuuji SAKA et al.

It is certified that error appears in the above-indentified patent and that said Letters Patent is hereby corrected as shown below:

At column 4, line 34, change "12a 12a" to ---12a, 12a---.

Signed and Sealed this

Third Day of October, 1995

Attest:

BRUCE LEHMAN

*Attesting Officer*  *Commissioner of Patents and Trademarks*